United States Patent
Kim

(10) Patent No.: US 9,462,152 B2
(45) Date of Patent: Oct. 4, 2016

(54) SYSTEM AND METHOD FOR HIDING REVERSIBLE INFORMATION

(71) Applicant: KOREA UNIVERSITY RESEARCH AND BUSINESS FOUNDATION, Seoul (KR)

(72) Inventor: Hyoung Joong Kim, Seoul (KR)

(73) Assignee: KOREA UNIVERSITY RESEARCH AND BUSINESS FOUNDATION (KR)

( * ) Notice: Subject to any disclaimer, the term of this patent is extended or adjusted under 35 U.S.C. 154(b) by 0 days.

(21) Appl. No.: 14/759,254

(22) PCT Filed: Jan. 6, 2014

(86) PCT No.: PCT/KR2014/000101
§ 371 (c)(1),
(2) Date: Jul. 6, 2015

(87) PCT Pub. No.: WO2014/107070
PCT Pub. Date: Jul. 10, 2014

(65) Prior Publication Data
US 2015/0350486 A1    Dec. 3, 2015

(30) Foreign Application Priority Data

Jan. 4, 2013 (KR) .......... 10-2013-0001285
Jan. 6, 2014 (KR) .......... 10-2014-0001368

(51) Int. Cl.
*G06K 9/00* (2006.01)
*H04N 1/32* (2006.01)
*H04N 19/467* (2014.01)
*G06T 1/00* (2006.01)

(52) U.S. Cl.
CPC .......... *H04N 1/32277* (2013.01); *G06T 1/0021* (2013.01); *G06T 1/0035* (2013.01);
(Continued)

(58) Field of Classification Search
CPC .......... G06T 1/0021; G06T 1/0035; G06T 2201/0053; G06T 2201/0061; G06T 2201/0203; H04N 19/467; H04N 1/32277
USPC .......................................... 382/100
See application file for complete search history.

(56) References Cited

U.S. PATENT DOCUMENTS 6,141,446 A * 10/2000 Boliek ............. H03M 7/30
                                              375/240.11
6,208,745 B1    3/2001 Florencio et al.
(Continued)

FOREIGN PATENT DOCUMENTS

JP    2006253755    9/2006
KR   1020070076130   7/2007
(Continued)

OTHER PUBLICATIONS

International Search Report—PCT/KR2014/000101 dated Apr. 18, 2014.

*Primary Examiner* — Tom Y Lu
(74) *Attorney, Agent, or Firm* — Cantor Colburn LLP

(57) ABSTRACT

A reversible information hiding apparatus, comprises: an image compressing unit that encodes an original image file to output a compressed image file by applying a preset compression format; an information hiding processing unit that divides a bit stream of the compressed image file into a plurality of bit blocks each having a preset length, allocates, to the plurality of the bit blocks, a plurality of hiding information bits obtained from dividing preset hiding information data into preset length units, and converts bit values of the bit blocks based on values of the allocated hiding information bits; and an information-hidden image providing unit that provides a reversible information extracting apparatus with the information-hidden image file comprising the bit blocks, of which the bit values have been converted.

18 Claims, 10 Drawing Sheets

(52) U.S. Cl.
CPC ..... *H04N19/467* (2014.11); *G06T 2201/0053* (2013.01); *G06T 2201/0061* (2013.01); *G06T 2201/0203* (2013.01)

(56) References Cited

U.S. PATENT DOCUMENTS 7,389,420 B2 * 6/2008 Tian .................. G06F 21/10
380/209

7,561,714 B2 * 7/2009 Tian .................. G06T 1/0028
382/100

FOREIGN PATENT DOCUMENTS

| KR | 1020090028288 | 3/2009 |
| KR | 1020090035237 | 4/2009 |
| KR | 1020110098077 | 9/2011 |

* cited by examiner

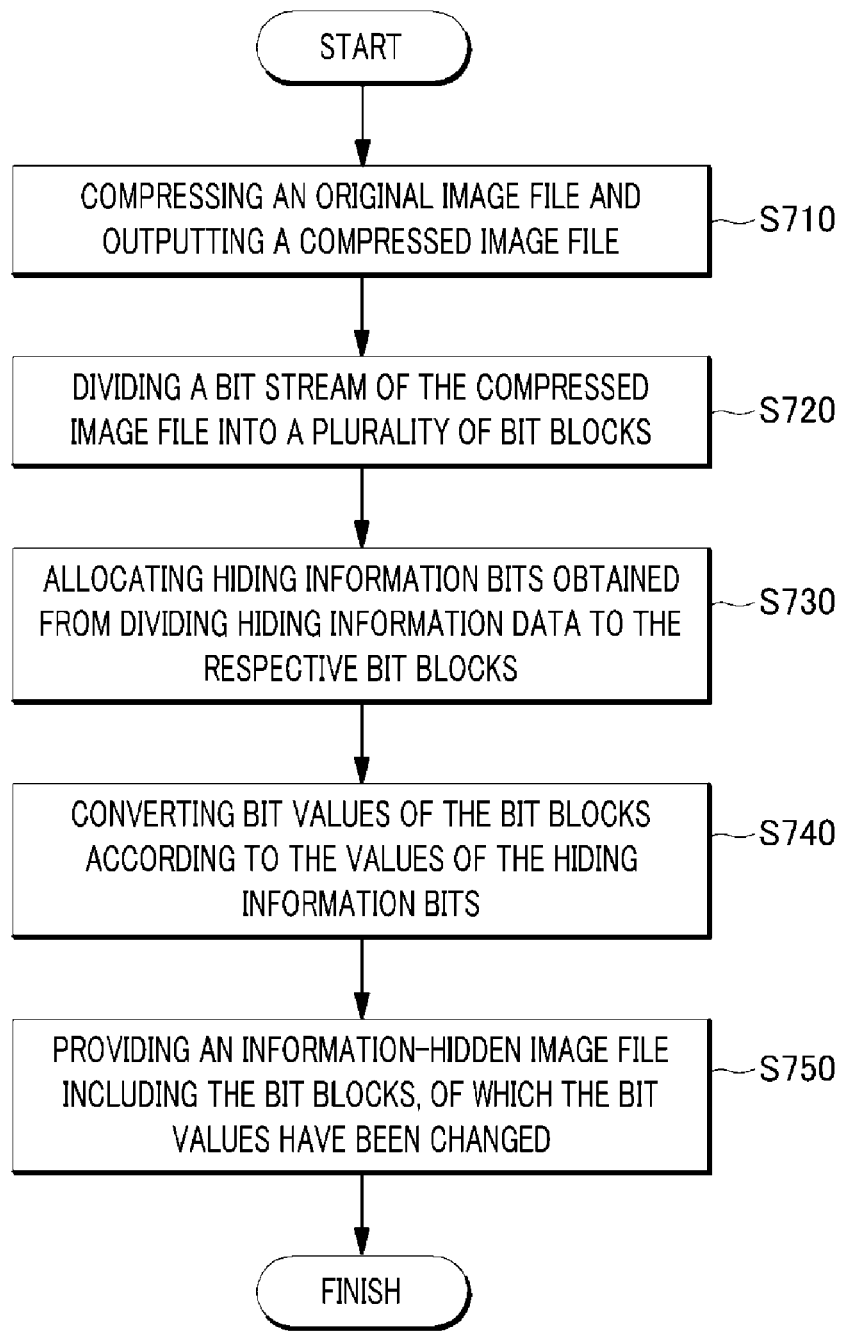

SYSTEM AND METHOD FOR HIDING REVERSIBLE INFORMATION

TECHNICAL FIELD

The embodiments described herein pertain generally to a system and a method for hiding reversible information in a compressed image and extracting the information hidden in the compressed image.

BACKGROUND

Various information protection techniques are being developed to protect digital media that can be easily copied or modified.

Among the techniques, information hiding as well as encoding is being widely used to assure confidentiality. According to this information hiding technique, a digital medium can be modified, and data can be embedded into the digital medium.

In this regard, Korean Patent Application Publication No. 10-2007-0076130 (Title of Invention: "Information Embedding and Extracting Method for Image Authentication") describes a lossless data embedding method, which does not cause a loss of original data during processes of embedding and extracting information; according to the method, an image is divided into a multiple number of blocks, each of the divided blocks is divided into sub-blocks, and authentication information is embedded into one pixel of each of the sub-blocks, wherein the authentication information (binary information) is inserted into a pixel having a minimum pixel value.

However, there has been a limit since it is not easy to reversibly hide information in a compressed image, and not an original image, as a random number output is generated when an image is compressed.

SUMMARY

In order to solve the foregoing problems, example embodiments provide an apparatus and a method for hiding information, which additionally encode and hide information in an already compressed image, and an apparatus and a method for extracting information from an image file, in which information has been hidden.

However, the problems sought to be solved by the present disclosure are not limited to the above description, and other problems can be clearly understood by those skilled in the art from the following description.

According to one example embodiment, there is provided a reversible information hiding apparatus, comprising: an image compressing unit that encodes an original image file to output a compressed image file by applying a preset compression format; an information hiding processing unit that divides a bit stream of the compressed image file into a plurality of bit blocks each having a preset length, allocates, to the plurality of bit blocks, a plurality of hiding information bits obtained from dividing preset hiding information data into preset length units, and converts bit values of the bit blocks based on values of the allocated hiding information bits; and an information-hidden image providing unit that provides a reversible information extracting apparatus with the information-hidden image file comprising the bit blocks, of which the bit values have been converted.

Especially, the reversible information extracting apparatus may comprise a compressed image inputting unit that receives input of an information-hidden image file, in which hiding information data have been encoded in a compressed image file, from a reversible information hiding apparatus; a restoration pre-processing unit that decodes the information-hidden image file in a bit block unit with a preset length by applying a preset restoration format; a blocky effect calculating unit that calculates a blocky effect value based on subtraction of boundary pixel values between each of the pixel blocks of the decoded bit blocks and at least one adjacent pixel block thereof; a hidden information extracting unit that extracts hiding information bits hidden in the bit blocks based on a result of comparing the calculated blocky effect values and the preset blocky effect threshold value, and converts the bit values of the bit blocks prior to the decoding based on values of the hiding information bits; and an image restoring unit that decodes the bit blocks, of which the bit values have been converted, in the restoration format through the hidden information extracting unit to restore the original image file.

According to another example embodiment, there is provided method enabling a reversible information hiding apparatus to hide information in a pre-compressed image file, the method comprising: (a) encoding an original image file in a preset compression format to output a compressed image file; (b) dividing a bit stream of the compressed image file into a plurality of bit blocks each having a preset length; (c) allocating, to the plurality of the bit blocks, a plurality of hiding information bits obtained from dividing preset hiding information data into preset length units; (d) converting bit values of the bit blocks based on values of the allocated hiding information bits; and (e) providing the reversible information extracting apparatus with an information-hidden image file comprising the bit blocks, of which the bit values have been converted.

According to still another example embodiment, there is provided a method enabling a reversible information extracting apparatus to extract hiding information data hidden in an information-hidden image file, comprising: (a) receiving input of the information-hidden image file, in which hiding information data have been encoded in a compressed image file, from a reversible information hiding apparatus; (b) decoding the information-hidden image file in a bit block unit with a preset length by applying a preset restoration format; (c) calculating a blocky effect value based on subtraction of boundary pixel values between each of the pixel blocks of the decoded bit blocks and at least one adjacent pixel block thereof; (d) extracting hiding information bits hidden in the bit blocks based on a result of comparing the calculated blocky effect values and the present blocky effect threshold value; (e) converting the bit values of the bit blocks prior to the decoding based on values of the hiding information bits; and (f) decoding the bit blocks, of which the bit values have been converted, in the restoration format to restore the original image file.

According to the example embodiments, through the reversible encoding technique, which is capable of thoroughly restoring data without needing to modify original data, hiding information data can be additionally encoded without causing a data loss of an already compressed image file.

Further, according to the example embodiments, an accurate decoding outcome can be acquired by decoding an image file obtained from additionally encoding hiding information data on a compressed image file, by using blocky effect values among adjacent pixel blocks.

BRIEF DESCRIPTION OF THE DRAWINGS

FIG. 7 is a flow chart for describing a reversible information hiding method according to an example embodiment.

MODE FOR CARRYING OUT THE INVENTION

Figure 1:
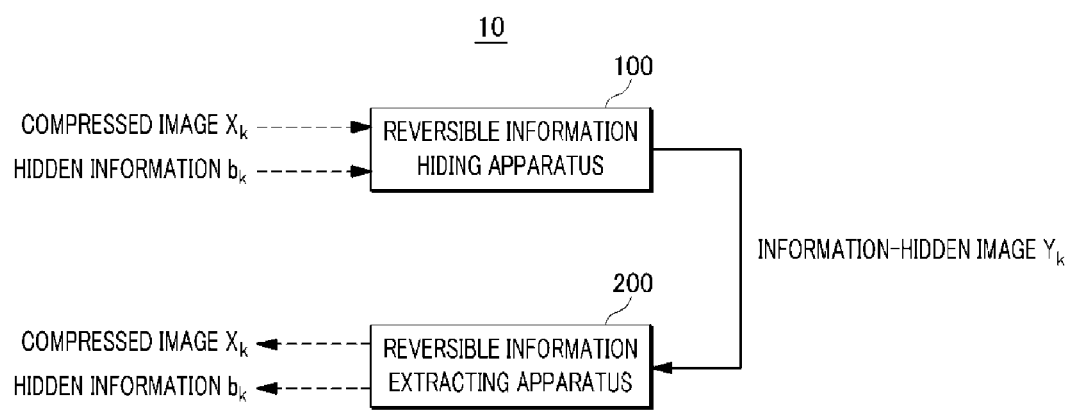
FIG. 1 is a block diagram illustrating a configuration of a reversible information hiding system according to an example embodiment.

Hereinafter, example embodiments will be described in detail so that inventive concept may be readily implemented by those skilled in the art. However, it is to be noted that the present disclosure is not limited to the example embodiments and examples but can be realized in various other ways. In drawings, parts not directly relevant to the description are omitted to enhance the clarity of the drawings, and like reference numerals denote like parts through the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a block diagram illustrating a configuration of a reversible information hiding system according to an example embodiment.

As shown in FIG. 1, a reversible information hiding system 10 according to an example embodiment includes a reversible information hiding apparatus 100 and a reversible information extracting apparatus 200.

Specifically, the reversible information hiding apparatus 100 processes second encoding to hide information data ($b_k$) in a compressed image ($X_k$), which has been subject to first encoding in a set compression format, and output an information-hidden image ($Y_k$) as a result of the second encoding.

The reversible information extracting apparatus 200 receives input of the information-hidden image ($Y_k$) provided from the reversible information hiding apparatus 100, and extracts the hidden information data ($b_k$) from the information-hidden image ($Y_k$) to acquire the compressed image ($X_k$). The reversible information extracting apparatus 200 decodes the compressed image ($X_k$) based on the extracted hidden information data ($b_k$) to restore an original image.

Hereinafter, a configuration and an operation of the reversible information hiding apparatus according to an example embodiment is described in detail.

Figure 2:
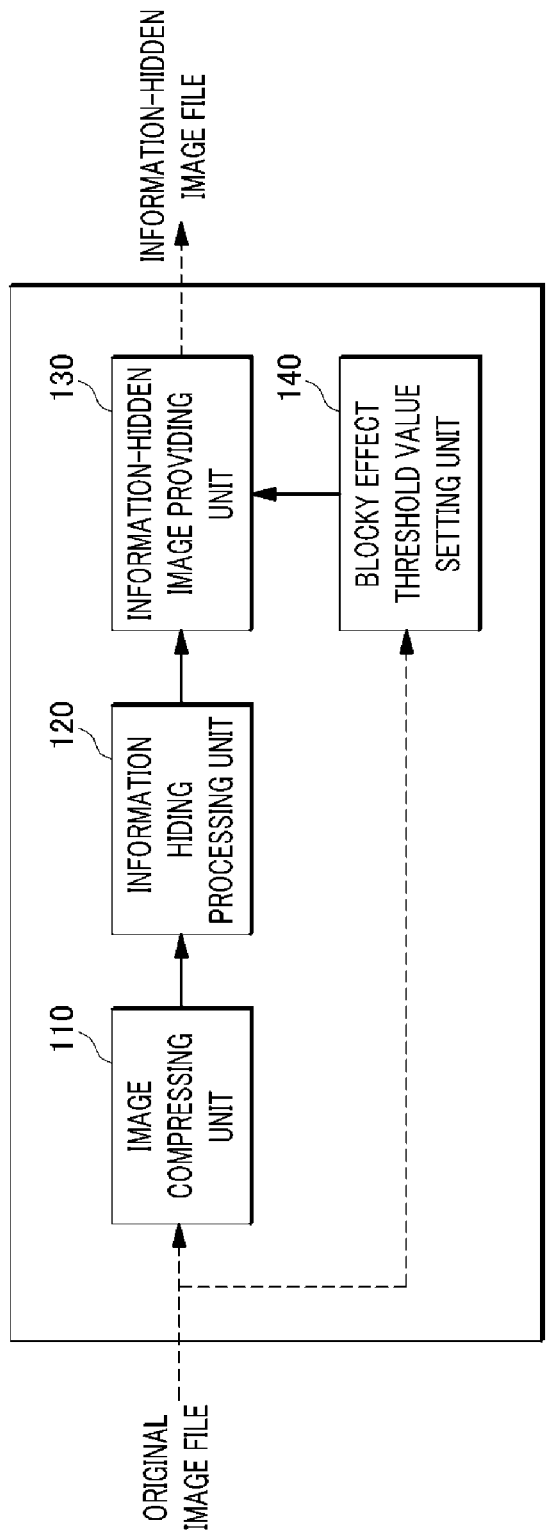
FIG. 2 is a block diagram illustrating a configuration of a reversible information hiding apparatus according to an example embodiment.

FIG. 2 is a block diagram illustrating a configuration of the reversible information hiding apparatus according to an example embodiment.

As shown in FIG. 2, the reversible information hiding apparatus 100 according to an example embodiment includes an image compressing unit 110, an information hiding processing unit 120, an information-hidden image providing unit 130 and a blocky effect value setting unit 140.

The image compressing unit 110 encodes (i.e., 'first encoding') an original image file in a preset compression format and outputs the compressed image file.

The information hiding processing unit 120 divides a bit stream of the compressed image file output from the image compressing unit 110 into a multiple number of bit blocks, and allocates and hides (i.e., 'second encoding') hiding information data in the respective bit blocks.

Specifically, the information hiding processing unit 120 divides the bit stream of the compressed image file into a multiple number of bit blocks each having a preset length (hereinafter, referred-to as 'L'). Additionally, for the hidden information extraction processing in the reversible information extracting apparatus 200 as described later, the information hiding processing unit 120 may further provide length information (i.e., 'L') for the bit blocks through the information-hidden image providing unit 130.

In addition, the information hiding processing unit 120 divides a bit stream of preset hiding information data into bit units each having a preset length (i.e., bit digits) to generate a multiple number of hiding information bits. In this case, the information hiding processing unit 120 may divide the hiding information data into single-digit or at least two (2)-digit bit units.

Figure 3:
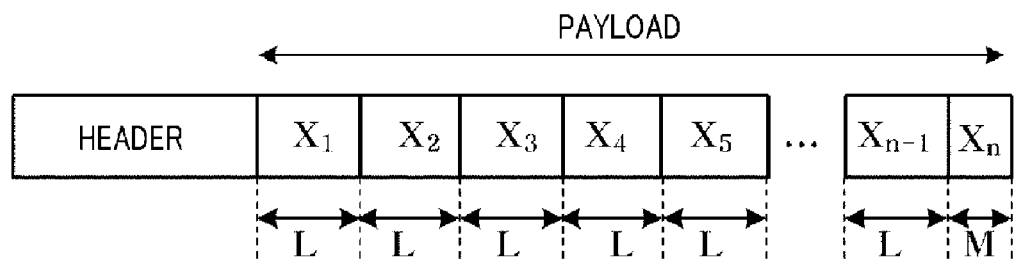
FIG. 3 is a diagram for describing a bit stream structure of a compressed image file according to an example embodiment.

For example, FIG. 3 is a diagram for describing a bit stream structure of a compressed image file according to an example embodiment.

As shown in FIG. 3, the bit stream of the compressed image file consists of a header and a payload, and the information hiding processing unit 120 divides a bit stream of the payload, excluding the header, in the bit stream of the compressed image file into preset length (i.e., L) units to distinguish the multiple number of the bit blocks ($X_k$). In this case, the information hiding processing unit 120 may set the length of one bit block of the bit blocks based on the size of the hiding information data to be hidden. That is, the information hiding processing unit 120 may divide the bit stream of the compressed image file into bit blocks, which correspond to the hiding information bits in number.

The information hiding processing unit 120 allocates the hiding information bits to the multiple bit blocks, respectively, and performs encoding (i.e., 'second encoding'), in which according to values of the allocated hiding information bits, bit values of the corresponding bit blocks are converted.

Specifically, if hiding information bits in a single-digit bit unit are allocated to the respective bit blocks, the information hiding processing unit 120 holds or reverses the bit values of the bit blocks in a 1 bit unit according to the values of the corresponding hiding information bits.

For example, the information hiding processing unit 120 hides information by holding a value of a first bit block (hereinafter, referred-to as a 'top-level bit block') of the payload of the compressed image file, and applying the operation of Formula 1 below to the other bit blocks.

If $b_k=0, Y_k=X_k$

If $b_k=1, Y_k=\overline{X}_k$ <Formula 1>

That is, if a value of a hiding information bit is a single-digit bit '0', bits of the bit blocks ($X_k$) are output while being held as they are. On the other hand, if a value of a hiding information bit is a single-digit bit '1', bits of the bit blocks ($X_k$) are reversed in a 1 bit unit and output. Additionally, the values of the hiding information bits that hold or reverse the bit values of the bit blocks may be mutually changed.

In addition, the information hiding processing unit 120 may hide hiding information bits in a two (2) or more-digit bit unit.

Specifically, the information hiding processing unit 120 generates a multiple number of random number bit streams each having a length corresponding to the length of the bit block, and matches different random number bit streams according to values of the allocated hiding information bits. In addition, the information hiding processing unit 120 processes second encoding through exclusive OR (or exclusive NOR) operation in a 1 bit unit between the respective random number bit streams and the bit blocks.

For example, if a hiding information bit is a two (2)-digit bit, the information hiding processing unit 120 changes a bit value each digit bit of the bit block according to the random number bit stream matched the bit value of the hiding information bit, by applying Formula 2 below.

If $b_k=0$ (i.e., $00_2$), $Y_k=X_k+R_0$

If $b_k=1$, (i.e., $01_2$), $Y_k=X_k+R_1$.

If $b_k=2$ (i.e., $10_2$), $Y_k=X_k+R_2$

If $b_k=3$ (i.e., $11_2$), $Y_k=X_k+R_3$ <Formula 2>

That is, if a value of a hiding information bit ($b_k$) is a two (2)-digit bit '$00_2$,' a random number bit stream '$R_0$' matches, and the bit block ($X_k$) and each digit bit of the random number bit stream $R_0$ are subject to an XOR operation so that a bit block, in which information is hidden, is output. In this manner, if K different random numbers are used for the random number bit streams, a '$\log_2 K$' hiding information bit per bit block may be hidden.

As described, when two (2) or more-digit hiding information bits are hidden in the bit blocks, the information hiding processing unit 120 may provide the reversible information extracting apparatus 200 with random number bit streams matching with the values of the hiding information bits, respectively, through the information hiding image providing unit 130.

Meanwhile, as shown in FIG. 3, when the bit stream of the compressed image file is divided into the bit blocks with the preset length L, bit blocks having a length smaller than L may be residual. That is, FIG. 3 illustrates that the compressed image file is divided into n bit blocks (i.e., $X_1$ to $X_n$), and a length of the last bit block (i.e., $X_n$) is M smaller than L. In this case, the information hiding processing unit 120 may allocate hiding information bits to the bit blocks excluding the residual bits having the length less than the preset length (i.e., L).

In addition, the information hiding processing unit 120 may set the sequence of encoding the bit blocks of the compressed image file to be non-sequential, in order to increase the accuracy in the hiding information extraction and the original image restoration processing in the reversible information extracting apparatus 200.

Specifically, the information hiding processing unit 120 divides an image frame of an original image file into a multiple number of pixel blocks, and sets the sequence of processing second encoding of bit blocks corresponding to the pixel blocks, respectively, to be non-sequential based on a positional sequence of the pixel blocks. Hereinafter, the result of non-sequentially processing the second encoding of the bit blocks of the compressed image file based on the positional sequence of the pixel blocks is described in detail with reference to FIG. 6.

The information-hidden image providing unit 130 provides the reversible information extracting apparatus 200 with an information-hidden image file, which includes the bit blocks that have been subject to the second encoding (i.e., conversion of bit values).

Meanwhile, in order to enable the reversible information extracting apparatus 200 to successfully extract hiding information data hidden in the information-hidden image file and restore the original image file, a blocky effect value among the pixel blocks corresponding to the respective bit blocks in the image frame of the original image file is necessary.

To this end, the reversible information hiding apparatus 100 includes a blocky effect threshold value setting unit 140.

The blocky effect threshold value setting unit 140 divides the image frame of the original image file into a multiple number of pixel blocks each having a preset size, and calculates a blocky effect value based on subtraction of boundary pixel values between each of the pixel blocks and at least one adjacent pixel block thereof. In addition, the blocky effect threshold value setting unit 140 sets a blocky effect threshold value based on the blocky effect values for the pixel blocks.

In this case, the blocky effect threshold value setting unit 130 may provide the reversible information extracting apparatus 200 with the blocky effect threshold values through the information-hidden image providing unit 130.

Figure 4:
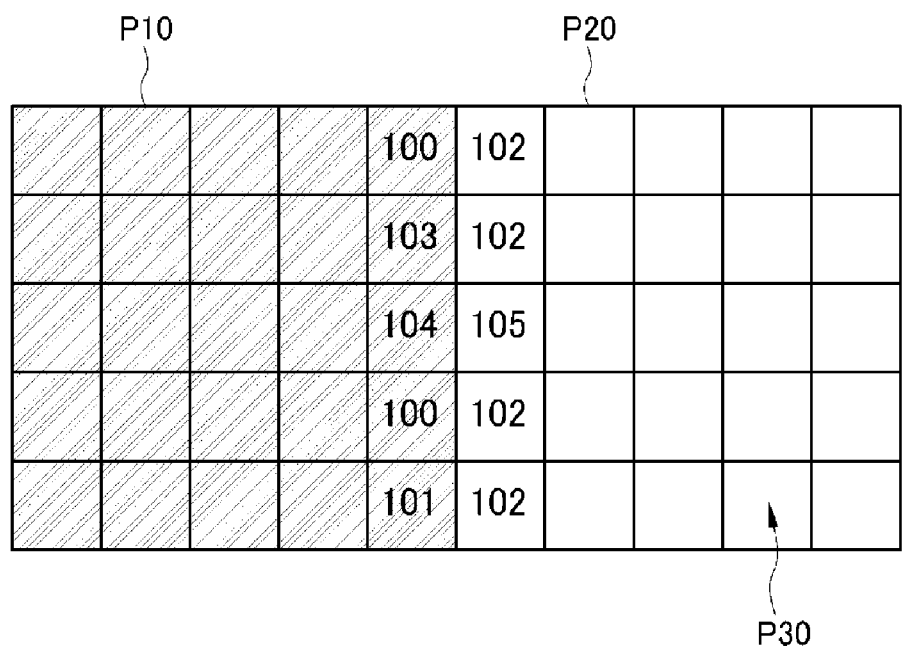
FIG. 4 is a diagram for describing a method of calculating a blocky effect value according to an example embodiment.

Specifically, FIG. 4 is a diagram for describing a method of calculating a blocky effect value according to an example embodiment.

FIG. 4 illustrates two (2) adjacent pixel blocks among the multiple pixel blocks included in the image frame of the image file. In this case, each of the two (2) pixel blocks P10 and P20 includes a multiple number of pixels P30, and a multiple number of boundary pixels exist at a boundary part of each of the two (2) adjacent pixel blocks.

For example, the blocky effect threshold value setting unit 140 calculates a blocky effect threshold value B based on subtraction of pixel values between the boundary pixels, by using Formula 3 below.

$$B = \frac{|100-102|+|103-102|+|104-105|+|100-102|+|101-102|}{5} = \frac{7}{5}$$ (Formula 3)

Formula 3 shows setting the blocky effect threshold value B by calculating a mean absolute difference (MAD) value, which is obtained by averaging absolute values of the pixel values for the boundary pixels of the adjacent pixel blocks.

Hereinafter, a reversible information hiding method according to an example embodiment is described in detail with reference to FIG. 7.

FIG. 7 is a flow chart for describing a reversible information hiding method according to an example embodiment.

First, an original image file is encoded using a preset compression format, and the compressed image file is output (S710).

A bit stream of the compressed image file is divided into a multiple number of bit blocks each having a preset length (S720).

Thereafter, a multiple number of hiding information bits obtaining from dividing preset hiding information data into preset length units are allocated to the multiple bit blocks (S730).

In this case, in S730, the image frame of the original image file is divided into a multiple number of pixel blocks each having a preset size. In addition, a sequence of allocating the hiding information bits to the bit blocks corresponding to the pixel blocks, respectively, may be set to be non-sequential based on a positional sequence of the pixel blocks.

Thereafter, based on a value of an allocated hiding information bit, a bit value of the corresponding bit block is converted (S740).

In S740, if a single-digit hiding information bit has been allocated, a bit value of the corresponding bit block may be held or reversed in a 1 bit unit according to the value of the hiding information bit.

In addition, in S740, if an at least two (2)-digit hiding information bit has been allocated, the bit value of the bit block may be converted by applying a random number bit stream matching to each of the hiding information bit values. First, a multiple number of random number bit streams having a length corresponding to the length of the bit block are generated. In addition, different random number bit streams match with the values of the allocated hiding information bits, respectively. Thereafter, a random number bit stream matching with an allocated hiding information bit and the corresponding bit block are subject to an exclusive OR or NOR operation in a 1 bit unit.

Next, the information-hidden image file including the bit blocks, of which the bit values have been converted, is provided to the reversible information extracting apparatus (S750).

In this case, in S750, length information preset for the bit bocks and the random number bit streams matching with the values of the hiding information bits are provided to the reversible information extracting apparatus 200 together with the information-hidden image file.

Meanwhile, in S720, the bit stream of the payload of the compressed image file, except for the header thereof, is divided into the multiple bit blocks, and as a result, S730 and S740 may process the bit blocks other than the top-level bit block of the payload.

In addition, the example embodiments may include steps of dividing the image frame of the original image file into a multiple number of pixel blocks each having a preset size, calculating a blocky effect value based on subtraction of boundary pixel values between each of the pixel blocks and at least one adjacent pixel block thereof, and setting a blocky effect threshold value based on the blocky effect values for the pixel blocks, prior to S750. In this case, in S750, the blocky effect threshold value may be further provided to the reversible information extracting apparatus 200.

Hereinafter, a configuration and an operation of the reversible information extracting apparatus 200 according to an example embodiment are described in detail.

Figure 8:
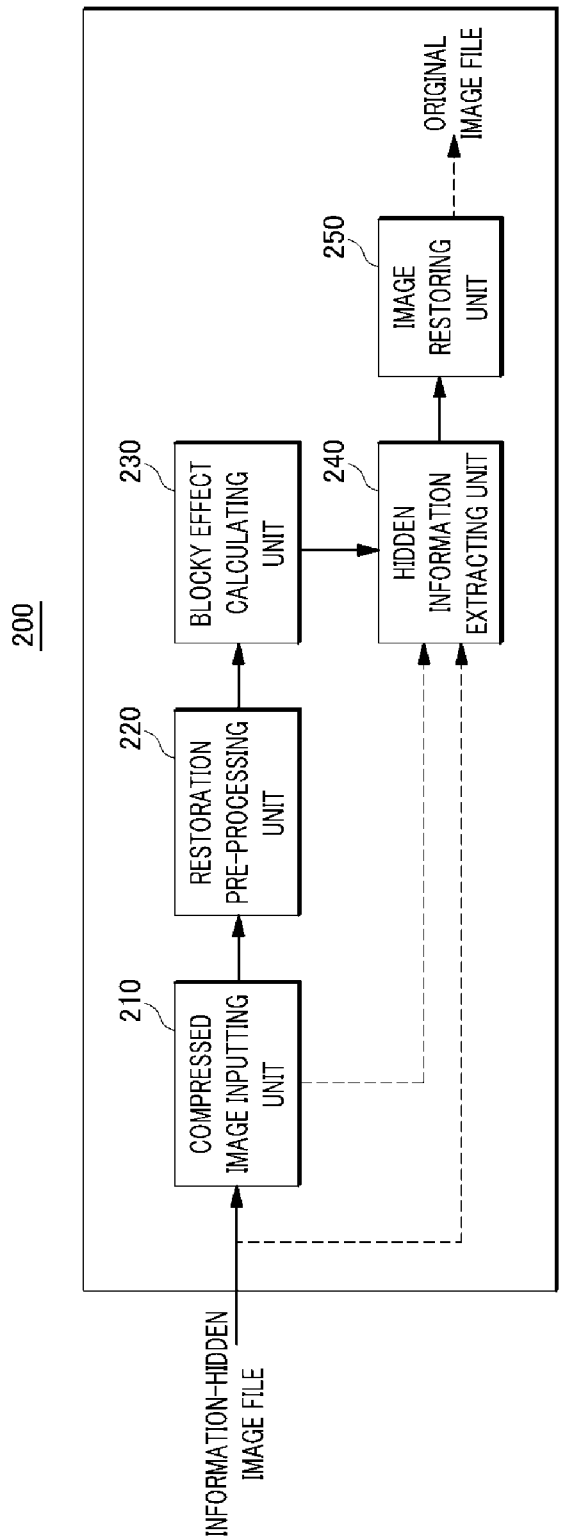
FIG. 8 is a block diagram illustrating a configuration of a reversible information extracting apparatus according to an example embodiment.

FIG. 8 is a block diagram illustrating a configuration of the reversible information extracting apparatus according to an example embodiment.

As shown in FIG. 8, the reversible information extracting apparatus 200 according to an example embodiment includes a compressed image inputting unit 210, a restoration pre-processing unit 220, a blocky effect calculating unit 230, a hidden information extracting unit 240, and an image restoring unit 250.

The compressed image inputting unit 210 receives input of an information-hidden image file, in which hiding information data have been encoded into a compressed image file, from the reversible information hiding apparatus 100.

In this case, the compressed image inputting unit 210 further receives input of a blocky effect threshold value set based on the blocky effect values of the pixel blocks of the image frame of the original image file, and length information for the bit block unit, from the reversible information hiding apparatus 100.

The restoration pre-processing unit 220 decodes the information-hidden image file in a preset restoration format, and decodes the information-hidden image file in a bit block unit having a preset length (hereinafter, referred-to as 'first decoding'). In this case, the preset restoration format corresponds to the compression format used when the reversible information hiding device 100 compresses the original image file.

The blocky effect calculating unit 230 calculates a blocky effect value based on subtraction of boundary pixel values between each of the pixel blocks of the bit blocks, which have been subject to the first decoding, and at least one adjacent pixel block thereof.

In this case, the blocky effect calculating unit 230 calculates subtraction of boundary pixel values between the pixel blocks of the bit blocks, which have been subject to the first decoding, and their adjacent pixel blocks, and calculates an average value of absolute values obtained from the subtraction of the boundary pixel values. The method of calculating a blocky effect value in the blocky effect calculating unit 230 may correspond to the method of calculating a blocky effect threshold value in the reversible information hiding apparatus 100.

The hidden information extracting unit 240 extracts information bits hidden in the bit blocks based on a result of comparing the calculated blocky effect values and the preset blocky effect threshold value, and processes second decoding to convert the bit values of the bit blocks prior to the first decoding based on the values of the hiding information bits. Additionally, the hidden information extracting unit 240 holds the bit value of the top-level bit block of the payload of the information-hidden image file, and converts the bit values of the bit blocks other than the top-level bit block.

Specifically, when the information-hidden image file is subject to first decoding in a bit block unit, if the decoding of the corresponding bit block is failed, a value of a hiding information bit will be a value that reverses the bit value of the corresponding bit block. For example, when the value of the hiding information bit is '1', if the reversible information hiding apparatus 100 has performed second encoding to reverse the bit value of the bit block of the compressed image file, it can be understood that the value of the hiding information bit will be '1' upon failure of decoding. On the other hand, if the decoding is successfully performed, the hiding information bit hidden in the corresponding bit block is likely to be '1' or '0.'

Accordingly, the hidden information extracting unit 240 calculates a blocky effect value between the pixel block of the bit block, for which first decoding has been successfully performed, and its adjacent pixel block, to determine whether the bit value of the corresponding bit block has been held or reversed.

In this case, the hidden information extracting unit 240 extracts a hiding information bit in a single-digit bit unit per bit block, and extracts a first hiding information bit having a first bit value when a calculated blocky effect value exceeds the preset blocky effect threshold value. In addition, the hidden information extracting unit 240 performs second decoding to hold or reverse the bit value of the corresponding bit block in a 1 bit unit according to the value of the extracted hiding information bit.

Meanwhile, when the blocky effect values for the bit blocks are calculated, other bit blocks, for which second decoding has been completed, may be used so as to calculate a more accurate blocky effect value for the corresponding bit block.

Specifically, FIG. 5 is a diagram for describing an example for calculation of a blocky effect value among pixel blocks of an image file according to an example embodiment.

FIG. 5 illustrates various examples for the state that a pixel block (i.e., a 'white' block), for which second decoding has not been performed, and another pixel block (i.e., a 'black' block), for which decoding has been completed, are adjacent to each other.

Figure 5A:
FIG. 5A is a diagram for describing an example for calculation of blocky effect values among blocks of an image file according to an example embodiment.
Figure 5B:
FIG. 5B is a diagram for describing an example for calculation of blocky effect values among blocks of an image file according to an example embodiment.
Figure 5C:
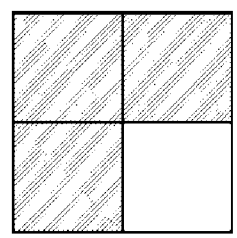
FIG. 5C is a diagram for describing an example for calculation of blocky effect values among blocks of an image file according to an example embodiment.
Figure 5D:
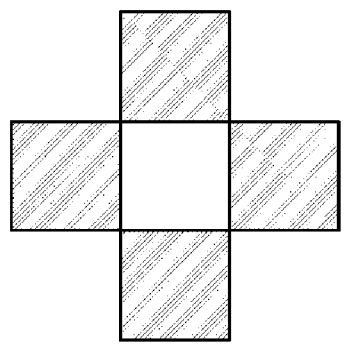
FIG. 5D is a diagram for describing an example for calculation of blocky effect values among blocks of an image file according to an example embodiment.

In this case, as shown in FIG. 5A and FIG. 5B, an adjacent pixel block, for which second decoding has been completed, may be present at any one of upper, lower, front and rear positions in view of a positional sequence of a pixel block, for which second decoding has not been performed. As shown in FIG. 5C and FIG. 5D, adjacent pixel blocks, for which second decoding has been completed, may be present at least two (2) of the upper, lower, front and rear positions. Especially, if adjacent pixel blocks, for which second decoding has been completed, are present at the four (4) positions around a pixel block, for which second decoding has not been performed, a more accurate blocky effect value can be calculated as the area where the pixel blocks are adjacent to one another is wider (namely, the number of the boundary pixels increases).

Meanwhile, the sequence of encoding the bit blocks of the information-hidden image file in the reversible information hiding device 100 may be non-sequential based on the positional sequence of the pixel blocks on the image frame of the original image file. Accordingly, first and second decoding of the bit blocks of the information-hidden image file may be processed starting from a bit block corresponding to an adjacent pixel block in at least one of upper, lower, front and rear positions around a random pixel block according to the positional sequence on the image frame. For example, in FIG. 5D illustrates that four (4) black blocks are adjacent to one white block, and shows repetition of decoding processing, by which after second decoding of any one black block is completed, an adjacent block (i.e., a white block) in any one of upper, lower, front, and rear positions around the black block is skipped, and first and second decoding for a next block is performed.

Figure 6A:
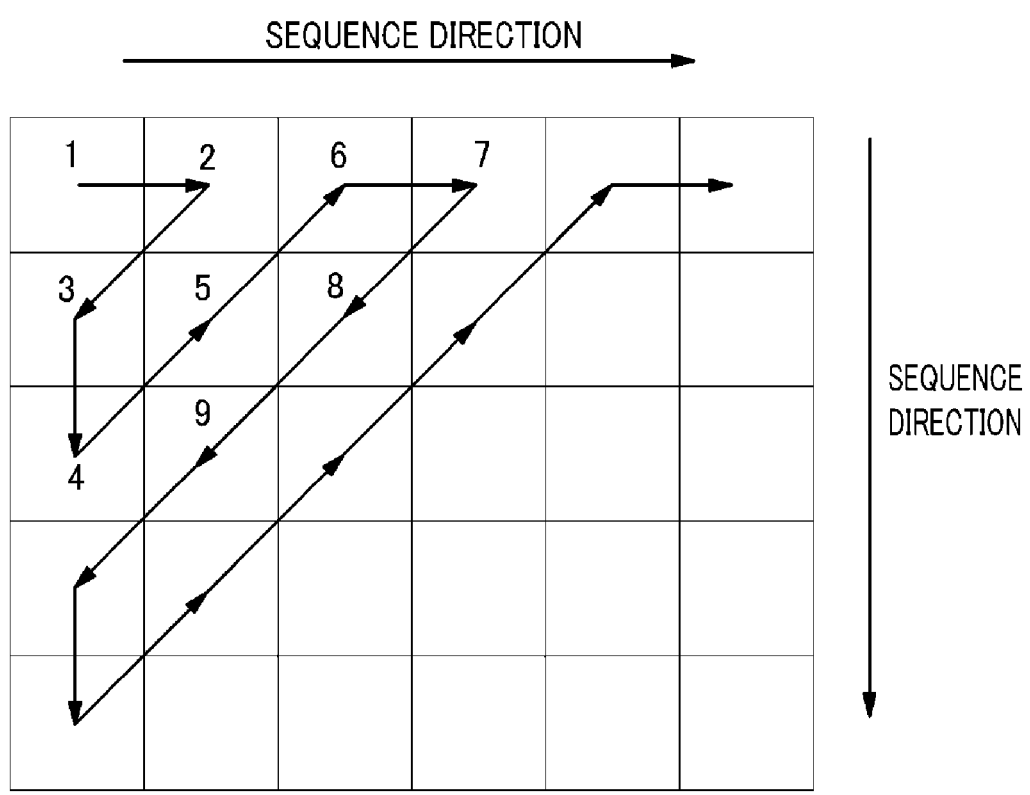
FIG. 6A is a diagram for describing a method of setting a decoding sequence of bit blocks of an information-hidden image file according to an example embodiment.
Figure 6B:
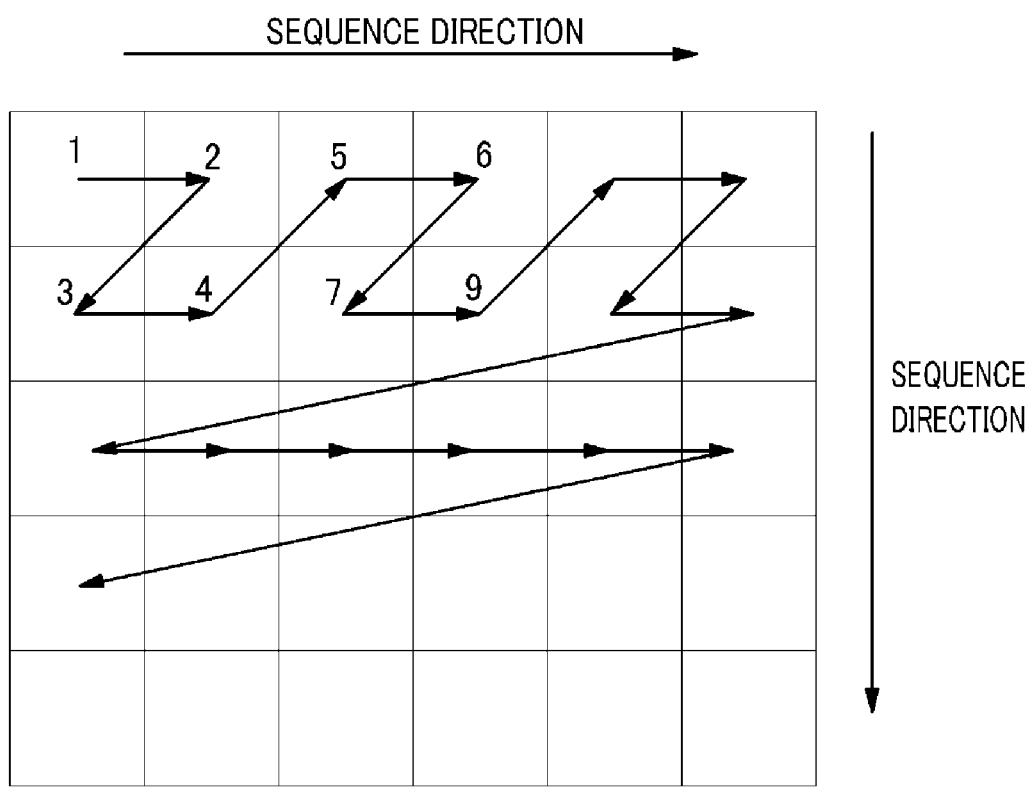
FIG. 6B is a diagram for describing a method of setting a decoding sequence of bit blocks of an information-hidden image file according to an example embodiment.

As another example, FIG. 6 is a diagram for describing a method of setting a decoding sequence of bit blocks of an information-hidden image file according to an example embodiment.

FIG. 6 illustrates processing decoding of the pixel blocks of the information-hidden image file in various zigzag manners non-sequential in view of the positional sequence (indicated by the 'sequence direction' arrows in FIG. 6) of the pixel blocks. Additionally, this decoding sequence is the same as the sequence, in which the reversible information hiding apparatus 100 performs second encoding for the hiding information bits into the bit blocks of the compressed image file. That is, the decoding sequence (indicated by the numerals '1 to 9' in FIG. 6) in FIG. 6 is the same as the sequence, in which the multiple bit blocks are included in the information-hidden image file.

Specifically, it is described hereinafter that one bit block corresponds to one pixel block on an image frame of the information-hidden image file. In addition, each bit block is indicated to correspond to the decoding sequence. In this case, a bit block 1 (i.e., the top-level bit block) corresponding to a first pixel block is a bit block, of which the original data have been held without second encoding at the time of encoding in the reversible information hiding apparatus 100. Accordingly, a first decoding result may be used as it is. After first decoding of the bit block 1, a blocky effect value is calculated by using the bit block 1 adjacent to the left side of the bit block 2 upon decoding of the bit block 2. Upon decoding of the bit block 3 thereafter, a block effect value is calculated by using the bit block 1 adjacent to the upper side of the bit block 3, and a blocky effect value for the bit block 4 is also calculated by using the bit black 3 adjacent to the upper side of the bit block 4. In addition, a blocky effect value of the bit block 5 is calculated by using the bit block 2 adjacent to the upper side of the bit block 5 and the bit block 3 adjacent to the left side of the bit block 5. In this manner, the bit blocks are decoded in a non-sequential order based on the positional sequence of the pixel blocks on the image frame.

Meanwhile, in FIG. 6A, after the decoding of the bit blocks 1 to 6 is completed, calculation of the blocky effect values for the already decoded bit blocks may be re-processed so as to further improve the accuracy of the blocky effect values. That is, upon re-processing of the decoding of the bit block 2, the blocky effect value can be re-calculated by using the bit block 1 adjacent to the left side of the bit block 2, the bit block 6 adjacent to the right side of the bit block 2, and the bit block 5 adjacent to the lower side of the bit block 2. When the blocky effect values for the already decoded bit blocks are re-calculated after completion of decoding of the bit blocks 1 to 9, the blocky effect value for the bit block 5 may be re-calculated by using the bit blocks adjacent in the peripheral four (4) directions of the bit block 5.

Returning to FIG. 6, the image restoring unit 250 restores the original image file by decoding the bit blocks, of which the bit values have been converted through the hidden information extracting unit 240, by using the restoration format.

Hereinafter, a reversible information extracting method according to an example embodiment is described in detail with reference to FIG. 9.

Figure 9:
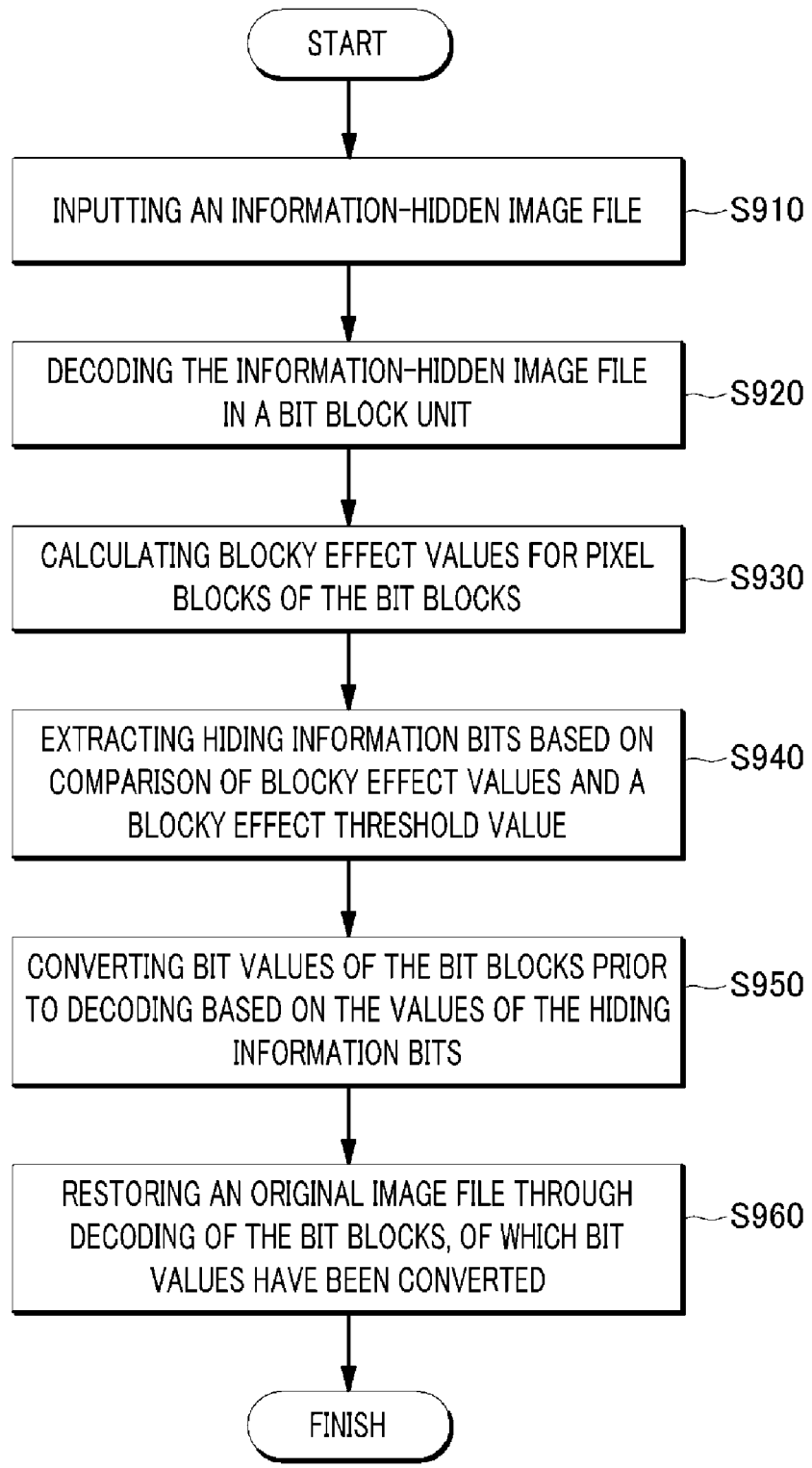
FIG. 9 is a flow chart for describing a reversible information extracting method according to an example embodiment.

FIG. 9 is a flow chart for describing a reversible information extracting method according to an example embodiment.

First, an information-hidden image file, in which hiding information data have been encoded in a compressed image file, is input from the reversible information hiding apparatus 100 (S910).

In this case, in S910, at least one of the blocky effect threshold value set based on the blocky effect values among the pixel blocks of the image frame of the original image file and length information of the bit block units may be further input.

Thereafter, the information-hidden image file is decoded in a bit block unit with a preset length by applying the preset restoration format (S920).

In this case, in S920, the decoding may be performed starting from a bit block corresponding to an adjacent pixel block in at least one of upper, lower, front and rear positions around a random pixel block in view of the positional sequence of the pixel blocks in the image frame of the original image file.

Next, a blocky effect value is calculated based on subtraction of boundary pixel values between each of the pixel blocks of the decoded bit blocks and at least one adjacent pixel block thereof (S930).

Specifically, subtraction of boundary pixel values between the pixel blocks of the decoded bit blocks and their adjacent pixel blocks is calculated, and a mean value of absolute values for the subtraction of the boundary pixel values is calculated.

In addition, hiding information bits hidden in the bit blocks are extracted based on a result of comparing the calculated blocky effect values and the preset blocky effect threshold value (S940).

In this case, a hiding information bit in a single-digit bit unit per bit block is extracted. If a calculated blocky effect value exceeds the blocky effect threshold value, a first hiding information bit having a first bit value is extracted. If a calculated blocky effect value is the blocky effect threshold value or less, a second hiding information bit having a second bit value reversed from the first bit value is extracted.

Thereafter, the bit values of the respective bit blocks prior to the decoding are converted based on the values of the hiding information bits (S950).

Specifically, the bit values of the bit blocks are held or reversed in a 1 bit unit according to the values of the extracted hiding information bits. In this case, the bit value of the top-level bit block in the payload of the information-hidden image file is held, and the bit values of the bit blocks other than the top-level bit block are converted.

Thereafter, the bit blocks, of which the bit values have been converted, are decoded in the restoration format to restore the original image file (S960).

FIG. 8 and FIG. 9 have described that the reversible information extracting apparatus 200 extracts the hiding information bits in a single-digit bit unit per bit block of the information-hidden mage file, and then, performs second decoding.

However, a reversible information extracting apparatus 200 according to another example embodiment may extract hiding information bits in an at least two (2)-digit bit unit per bit block of the information-hidden image file, and processes second decoding. In this case, the reversible information extracting apparatus 200 may receive random number bit streams matching with the values of the hiding information bits, respectively, from the reversible information hiding apparatus 100. In addition, the reversible information extracting apparatus 200 may extract hiding information bits for the bit blocks and performs second decoding based on the result of calculating blocky effect values between the pixel blocks of the information-hidden image file and at least one adjacent pixel block thereof and the random number bit streams.

Example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

I claim:

1. A reversible information hiding apparatus, comprising:
an image compressing unit that encodes an original image file to output a compressed image file by applying a preset compression format;
an information hiding processing unit that divides a bit stream of the compressed image file into a plurality of bit blocks each having a preset length, allocates, to the plurality of the bit blocks, a plurality of hiding information bits obtained from dividing preset hiding information data into preset length units, and converts bit values of the bit blocks based on values of the allocated hiding information bits;
an information-hidden image providing unit that provides a reversible information extracting apparatus with the information-hidden image file comprising the bit blocks, of which the bit values have been converted; and a blocky effect threshold value setting unit that divides an image frame of the original image file into a plurality of pixel blocks each having a preset size, calculates a first blocky effect value based on subtraction of boundary pixel values between each of the pixel blocks and at least one adjacent pixel block thereof, and sets a blocky effect threshold value based on the first blocky effect values for the pixel blocks.

2. The reversible information hiding apparatus of claim 1, wherein the information hiding processing unit holds or reverses the bit values of the bit blocks in a 1 bit unit according to the values of the allocated hiding information bits.

3. The reversible information hiding apparatus of claim 1, wherein the information hiding processing unit
generates a plurality of random number bit streams each having a length corresponding to the length of the bit block,
matches different random number bit streams with the values of the allocated hiding information bits, and
performs an exclusive OR or NOR operation in a 1 bit unit between the random number bit streams matching with the allocated hiding information bits and the bit blocks.

4. The reversible information hiding apparatus of claim 1, wherein the information hiding processing unit divides a bit stream of a payload of the compressed image file, except for a header, into the plurality of the bit blocks, and
allocates the hiding information bits to the bit blocks other than a top-level bit block of the payload and converts the bit values.

5. The reversible information hiding apparatus of claim 1, wherein the information-hidden image providing unit provides the blocky effect threshold value to the reversible information extracting apparatus.

6. The reversible information hiding apparatus of claim 1, wherein the information hiding processing unit
sets a sequence of allocating the hiding information bits to the bit blocks corresponding to the respective pixel blocks and processing conversion of the bit values to be non-sequential based on a positional sequence of the pixel blocks.

7. The reversible information hiding apparatus of claim 1, wherein the reversible information extracting apparatus, comprising:
a compressed image inputting unit that receives input of an information-hidden image file, in which hiding information data have been encoded in a compressed image file, from a reversible information hiding apparatus;
a restoration pre-processing unit that decodes the information-hidden image file in a bit block unit having a preset length by applying a preset restoration format;
a blocky effect calculating unit that calculates a second blocky effect value based on subtraction of boundary pixel values between each of the pixel blocks of the decoded bit blocks and at least one adjacent pixel block thereof;
a hidden information extracting unit that extracts information bits hidden in the bit blocks based on a result of comparing the second blocky effect value and the blocky effect threshold value, and converts the bit values of the bit blocks prior to the decoding based on values of the hiding information bits; and
an image restoring unit that decodes the bit blocks, of which the bit values have been converted, in the restoration format through the hidden information extracting unit to restore the original image file.

8. The reversible information hiding apparatus of claim 7, wherein the hidden information extracting unit of the reversible information extracting apparatus
extracts the hiding information bit in a single-digit bit unit per the bit block,
extracts a first hiding information bit having a first bit value when the second blocky effect value exceeds the blocky effect threshold value, and
extracts a second hiding information bit having a second bit value reversed from the first bit value when the second blocky effect value is the blocky effect threshold value or less.

9. The reversible information hiding apparatus of claim 8, wherein the hidden information extracting unit of the reversible information extracting apparatus holds or reverses the bit values of the bit blocks in a 1 bit unit according to the values of the extracted hiding information bits.

10. The reversible information hiding apparatus of claim 7, wherein the compressed image inputting unit of the reversible information extracting apparatus further receives input of the blocky effect threshold value set based on the first blocky effect value for the pixel blocks of the image frame of the original image file from the reversible information hiding apparatus.

11. The reversible information hiding apparatus of claim 7, wherein the sequence, in which the bit blocks of the information-hidden image file have been encoded, is non-sequential in view of the positional sequence of the pixel blocks on the image frame of the original image file, and
the restoration pre-processing unit of the reversible information extracting apparatus processes decoding starting from a bit block corresponding to an adjacent pixel block in at least one of upper, lower, front and rear positions of a random pixel block in view of the positional sequence of the pixel bocks on the image frame of the original image file.

12. The reversible information hiding apparatus of claim 7, wherein the blocky effect calculating unit calculates of the reversible information extracting apparatus subtraction of boundary pixel values between the pixel blocks of the decoded bit blocks and adjacent pixel blocks thereof, and calculates a mean value of absolute values for the subtraction of the boundary pixel values.

13. The reversible information hiding apparatus of claim 7, wherein the hidden information extracting unit of the reversible information extracting apparatus holds a bit value of a top-level bit block of a payload of the information-hidden image file, and converts bit values of the bit blocks other than the top-level bit block.

14. A method enabling a reversible information hiding apparatus to hide information in a pre-compressed image file, the method comprising:
(a) encoding an original image file in a preset compression format to output a compressed image file;
(b) dividing a bit stream of the compressed image file into a plurality of bit blocks each having a preset length;
(c) allocating, to the plurality of the bit blocks, a plurality of hiding information bits obtained from dividing preset hiding information data into preset length units;

(d) converting bit values of the bit blocks based on values of the allocated hiding information bits;
(e) dividing the image frame of the original image file into a plurality of pixel blocks each having a preset size;
(f) calculating a blocky effect value based on subtraction of boundary pixel values between each of the pixel blocks and at least one adjacent pixel block thereof;
(g) setting a blocky effect threshold value based on the blocky effect values for the pixel blocks; and
(h) providing the reversible information extracting apparatus with an information-hidden image file comprising the bit blocks, of which the bit values have been converted.

15. The method of claim 14,
wherein the step (d) holds or reverses the bit values of the bit blocks in a 1 bit unit according to the values of the allocated hiding information bits.

16. The method of claim 14,
wherein the step (d) comprises:
generating a plurality of random number bit streams each having a length corresponding to the length of the bit block;
matching different random number bit streams with the values of the allocated hiding information bits; and
performing an exclusive OR or NOR operation in a 1 bit unit between the random number bit streams matching with the allocated hiding information bits and the bit blocks.

17. A method enabling a reversible information extracting apparatus to extract information data hidden in an information-hidden image file, comprising:
(a) receiving input of the information-hidden image file, in which hiding information data have been encoded in a compressed image file, from a reversible information hiding apparatus;
(b) decoding the information-hidden image file in a bit block unit with a preset length by applying a preset restoration format;
(c) calculating a blocky effect value based on subtraction of boundary pixel values between each of the pixel blocks of the decoded bit blocks and at least one adjacent pixel block thereof;
(d) extracting information bits hidden in the bit blocks based on a result of comparing the calculated blocky effect values and the present blocky effect threshold value;
(e) converting the bit values of the bit blocks prior to the decoding based on values of the hiding information bits; and
(f) decoding the bit blocks, of which the bit values have been converted, in the restoration format to restore the original image file.

18. The method of claim 17,
wherein the step (d)
extracts the hiding information bits in a single-digit unit per the bit block,
extracts a first hiding information bit having a first bit value when the calculated blocky effect value exceeds the blocky effect threshold value,
extracts a second hiding information bit having a second bit value reversed from the first bit value when the calculated blocky effect value is the blocky effect threshold value or less, and
the step (e) holds or reverses the bit values of the respective bit blocks in a 1 bit unit according to values of the extracted hiding information bits.

* * * * *